UNITED STATES PATENT OFFICE.

RUDOLPH BERENDES AND JÜRGEN CALLSEN, OF ELBERFELD, GERMANY, ASSIGNORS TO FARBENFABRIKEN VORM. FRIEDR. BAYER & CO., OF ELBERFELD, GERMANY, A CORPORATION OF GERMANY.

SALTS OF METHYLENE CITRYL SALICYLIC ACID.

No. 858,143.     Specification of Letters Patent.     Patented June 25, 1907.

Application filed September 11, 1906. Renewed May 4, 1907. Serial No. 371,819.

*To all whom it may concern:*

Be it known that we, RUDOLPH BERENDES and JÜRGEN CALLSEN, doctors of philosophy, chemists, citizen of the German Empire, residing at Elberfeld, Germany, Kingdom of Prussia, have invented new and useful Improvements in Salts of Methylene Citryl Salicylic Acid, of which the following is a specification.

Our application Serial Number 328055 filed July 27, 1906, relates to the new methylene citryl salicylic acid which exhibits valuable therapeutic properties. We have now found that this acid forms salts which have substantially the same effect. These salts are not known up till now and are formed according to the known methods of forming salts *e. g.* by the action of bases upon the acid. Two series of salts, namely acid and neutral salts may be obtained. They are solid compounds which yield the methylene citryl salicylic acid when treated with a mineral acid.

In order to illustrate our invention we give the following examples, the parts being by weight:

Example I. 444 parts of methylene citryl salicylic acid are stirred up with 200 parts of alcohol and 300 parts of water to a thin paste. 168 parts of sodium bicarbonate ($NaHCO_3$) are then gradually stirred into the liquid, by which treatment the solid compound enters into solution. It is exactly neutralized and alcohol and ether are added until the quantity of the precipitated sodium salt is no more increased. The mass of the reaction is then allowed to stand for some time. The sodium salt is isolated by filtration, washed with ether and dried at moderate temperature. The neutral sodium salt of methylene citryl salicylic acid having probably the formula:

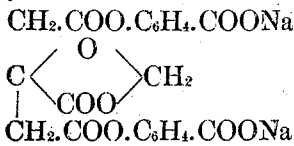

is after being dried, a white crystalline powder of neutral reaction having merely a slightly salty taste. It is readily soluble in water and insoluble in ether and benzene and yields the free methylene citryl salicylic acid by addition of hydrochloric acid to its aqueous solution. It possesses valuable therapeutic properties *e. g.* as a medicine for rheumatism, an average dose being about one gram.

Example II. 444 parts of methylene citryl salicylic acid are stirred up with 500 parts of alcohol (50%) to a paste and 197 parts of barium carbonate are gradually added to this paste. The barium salt of methylene citryl salicylic acid is then isolated as described in Example I. It is a white crystalline powder soluble in cold and readily soluble in hot water.

Example III. 444 parts of methylene citryl salicylic acid are stirred up with a 50% alcohol to a paste and 148 parts of lithium carbonate are gradually added to this paste. The resulting solution is filtered, if necessary, and the lithium salt is isolated by the addition of alcohol and ether. It is a white crystalline powder soluble in water with neutral solution.

The process is carried out in an analogous manner for preparing other salts, such as the potassium salt, the ammonium salt, the hexamethylentetramin salt, or the like.

Having now described our invention and in what manner the same is to be performed, what we claim is:—

1. The herein-described new salts of methylene citryl salicylic acid obtainable by the action of bases upon methylene citryl salicylic acid, being solid compounds yielding the free methylene citryl salicylic acid when treated with mineral acids; and exhibiting valuable therapeutic properties, substantially as described.

2. The herein-described new neutral sodium salt of methylene citryl salicylic acid, obtainable by the action of sodium bicarbonate upon methylene citryl salicylic acid, being a white crystalline powder readily soluble in water with a neutral reaction, insoluble in ether and benzene; methylene citryl salicylic acid being regenerated by the addition of hydrochloric acid to the aqueous solution; and exhibiting valuable therapeutic properties, substantially as hereinbefore described.

In testimony whereof we have hereunto set our hands in the presence of two subscribing witnesses.

RUDOLPH BERENDES. [L. S.]
JÜRGEN CALLSEN. [L. S.]

Witnesses:
OTTO KÖNIG,
OTTO BUSCH.